Nov. 8, 1966    F. H. LINDALL ET AL    3,283,846
IMPULSE SEISMIC DEVICE

Filed Oct. 2, 1963    4 Sheets-Sheet 1

INVENTORS
Fred H. Lindall
William H. Mayne,
BY Watson, Cole, Grindle & Watson
ATTORNEYS Nov. 8, 1966  F. H. LINDALL ETAL  3,283,846
IMPULSE SEISMIC DEVICE Filed Oct. 2, 1963  4 Sheets-Sheet 4

INVENTORS
Fred H. Lindall
William H. Mayne,
BY Watson, Cole, Grindle & Watson

ATTORNEYS

United States Patent Office 3,283,846
Patented Nov. 8, 1966

3,283,846
IMPULSE SEISMIC DEVICE
Fred H. Lindall and William Harry Mayne, San Antonio, Tex., assignors to Olive S. Petty, San Antonio, Tex.
Filed Oct. 2, 1963, Ser. No. 314,583
7 Claims. (Cl. 181—.5)

This invention relates to seismic wave generators and methods of use and more particularly, it relates to impulse seismic devices for striking the earth to develop shock waves useful in seismic surveying.

In the field of seismic surveying, a dropping weight has been used to generate shock waves which are detected to develop a record displaying conditions of the underground strata. In a preferred method of developing such records, a sequential series of single shocks is used by changing the impact device from location to location after each shock wave is recorded. A multiplicity of such records are then combined and processed to give mapping results over the field of survey in the conventional manner or as described in the U.S. Patent 2,732,906 issued to William H. Mayne.

It is convenient therefore, to have mobile mounted shock wave generators that are free to relocate with a minimum of effort. Therefore, cranes and trucks have been used to transport and drop weights by force of gravity. When the above system of data processing is used to combine in synchronism the results of a large number of readings taken at different locations, this type of shock wave generation is permissible. However, some of the weights required to produce significant shock waves are several tons, or if less, must be dropped from significant heights. Thus, the advantage of mobility is lessened by requirements to use unwieldly bulldozing types of equipment and top-heavy crane structures. Also the significant time delay variations incurred in freely-falling weights lead to synchronization problems in the associated detecting-recording equipment. Limiting velocities attainable from maximum legal vehicle heights of twelve to sixteen feet are in the order of thirty feet per second.

If heavy weights are used or mechanical spring loaded accelerating means, the mechanisms quickly become unreliable because of wear and fatigue. Limiting velocities of a solid spring device are in the order of forty feet per second. Also, significant shock and vibration is transferred to the truck and accompanying instrumentation which may be carried thereon, thereby increasing the possibility of error.

The present invention proposes more versatile equipment for generating shock waves, which will provide significantly greater power with better mobility and will eliminate many of the problems encountered in conventional equipment.

In the use of mobile seismic shock generators certain other problems appear. For example, the force must be significant yet should not exceed elastic limits of associated equipment. Furthermore, the terrain may be found in many different sorts of condition. It may be soft, such as a plowed field, hard such as on a rock surface, or mixed with stones, tree roots, etc. Thus, a shock generating device must be adaptable to the various conditions under which it works to produce substantially uniform operation, without introducing damage to the equipment even when very high impact energy is provided.

An object of the invention, therefore, is to provide improved impulse seismic devices and methods.

It is another object of the invention to produce improved mobile seismic wave generating equipment, which is readily used with detecting-recording equipment for consolidating multiple patterns.

Another object of the invention is to produce compact mobile equipment capable of producing shock waves having significant energy, and accurately timed.

A further object of the invention is to provide simply operated seismic wave generating means which is not inclined toward fatigue and breakdown even when used in various locations under different conditions.

In accordance with the invention, an impulse seismic device is provided with an impact hammer driven by hydraulic accelerating means to strike an impact plate firmly positioned on the ground. The entire array is carried on a relatively light truck, and is adaptable to proper positioning and operation in various sorts of terrain conditions. In this apparatus velocities in the order of 110 feet per second have been attained, thus significantly improving seismic wave energy available from portable generators.

Further, more detailed embodiments of the invention are described along with further objects and features of advantage, with reference to the accompanying drawings, wherein.

Figure 3:
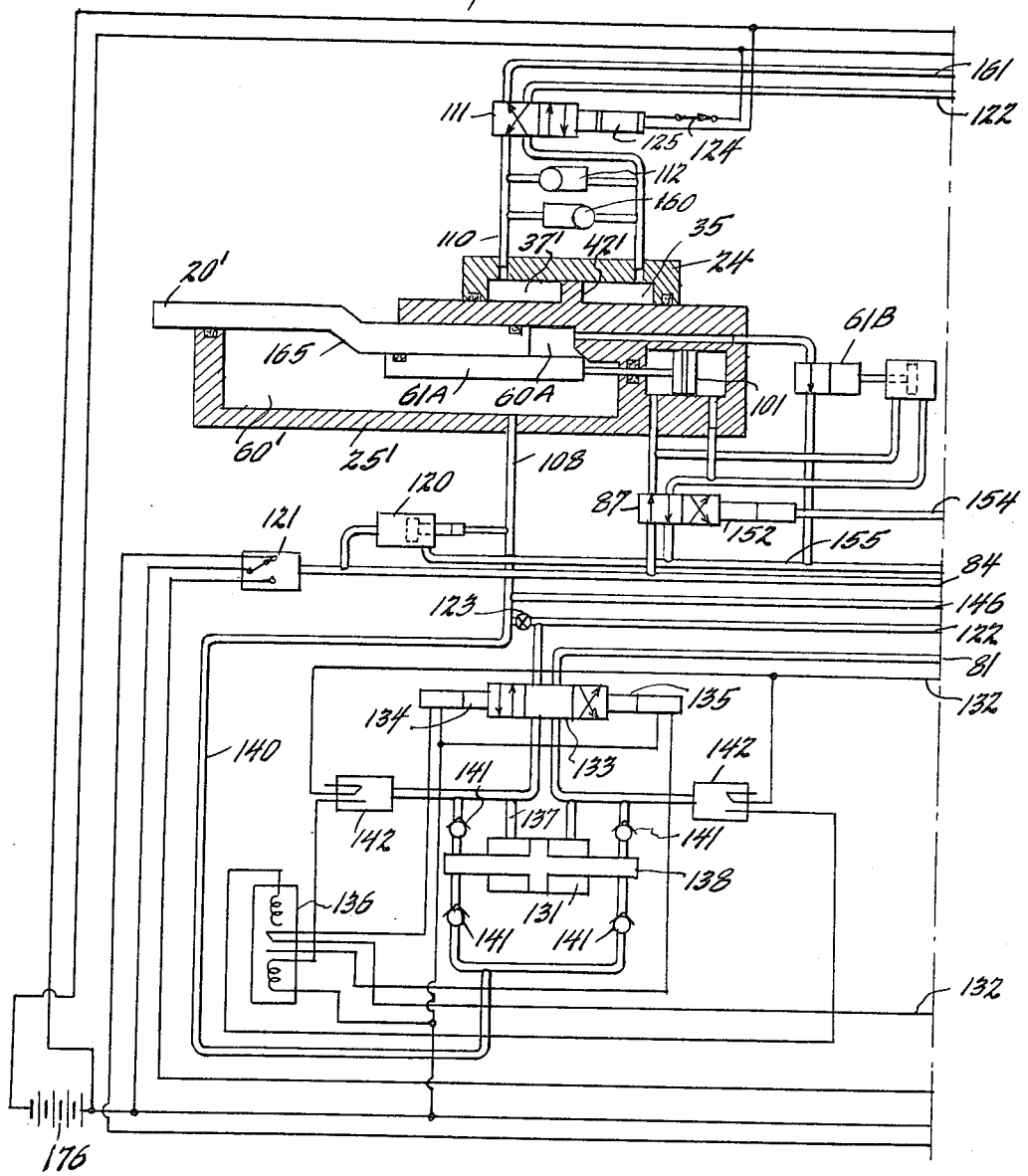
Figure 4:
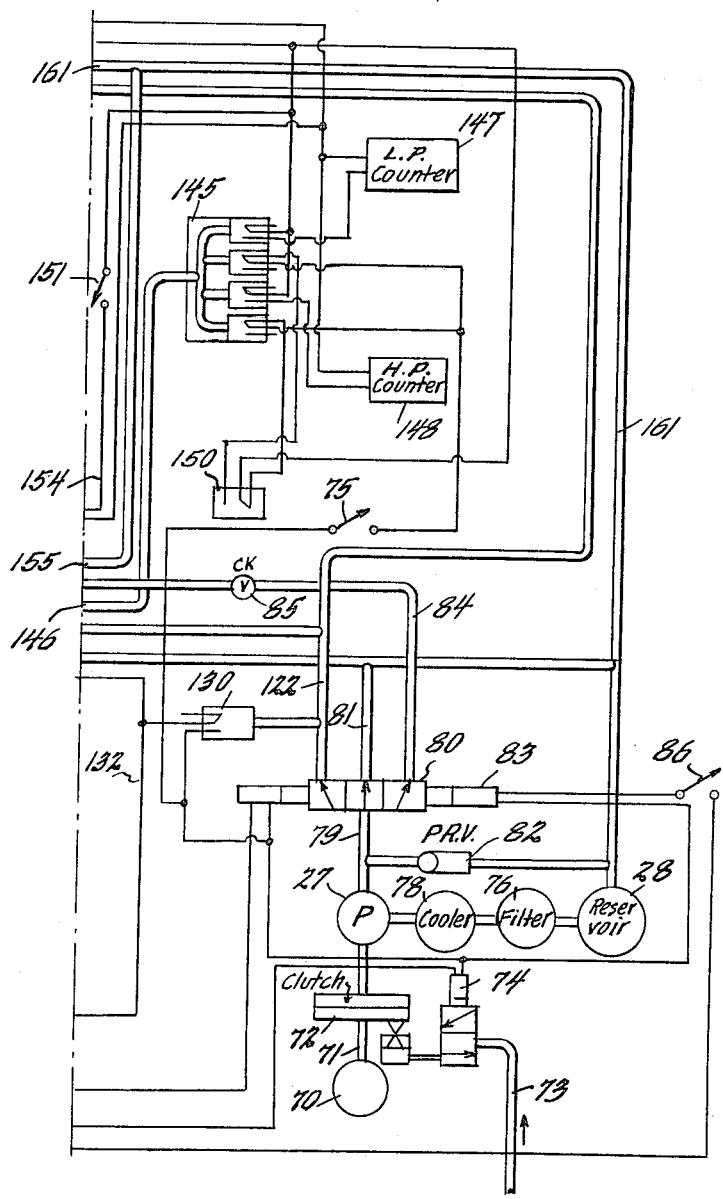

FIGURES 3 and 4 comprise a schematic diagram of a hydraulic system operable in accordance with the invention;

FIGURE 5 is a sub-assembly view in section of a hydraulically operated hammer drive sub-assembly afforded in one embodiment of the invention;

FIGURE 6 is a cutaway view partly in section of a hammer assembly constructed in accordance with the invention.

Figure 1:
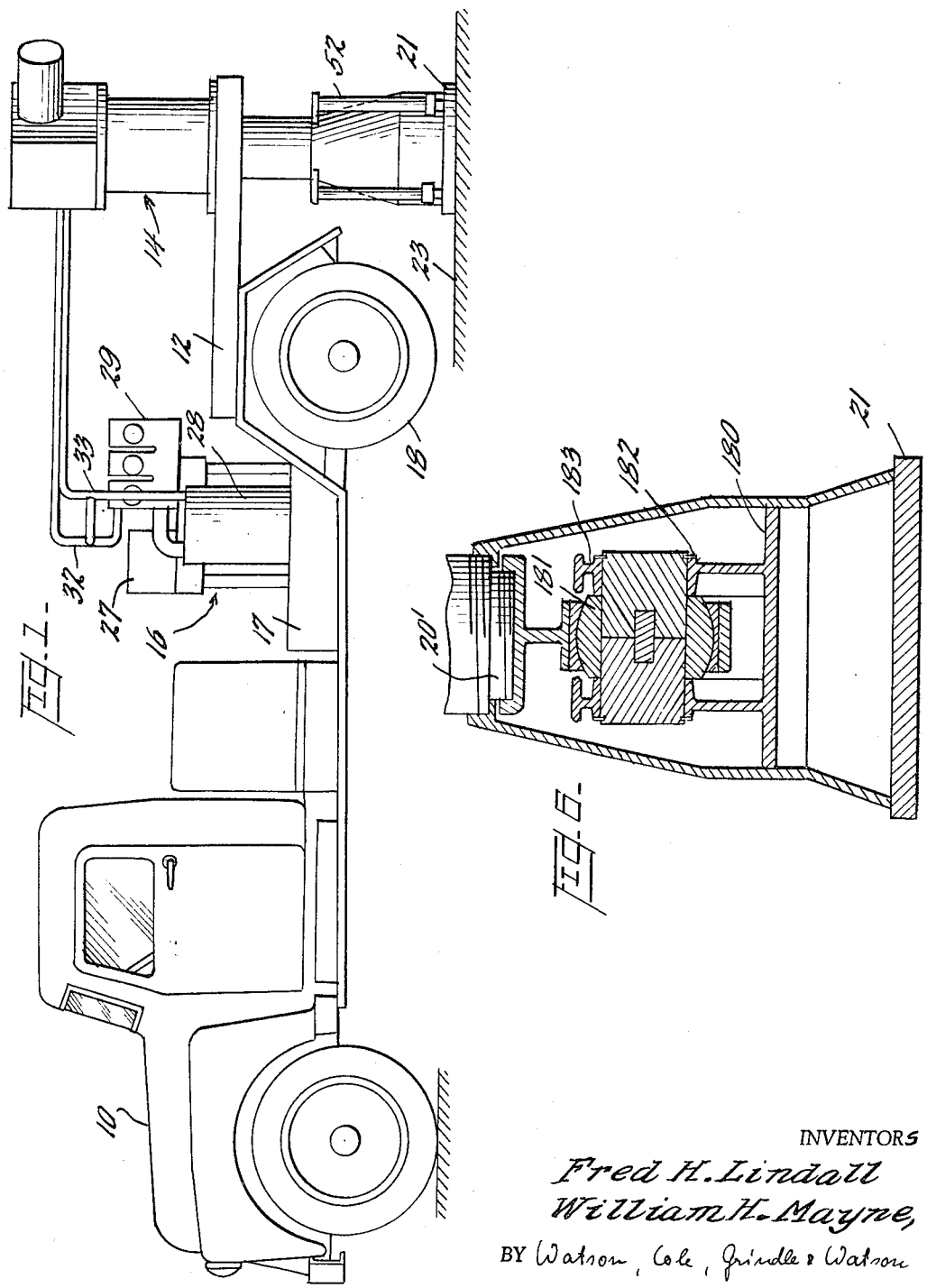
FIGURE 1 is a view of a truck mounted seismic wave generator as afforded by the invention.
Figure 2:
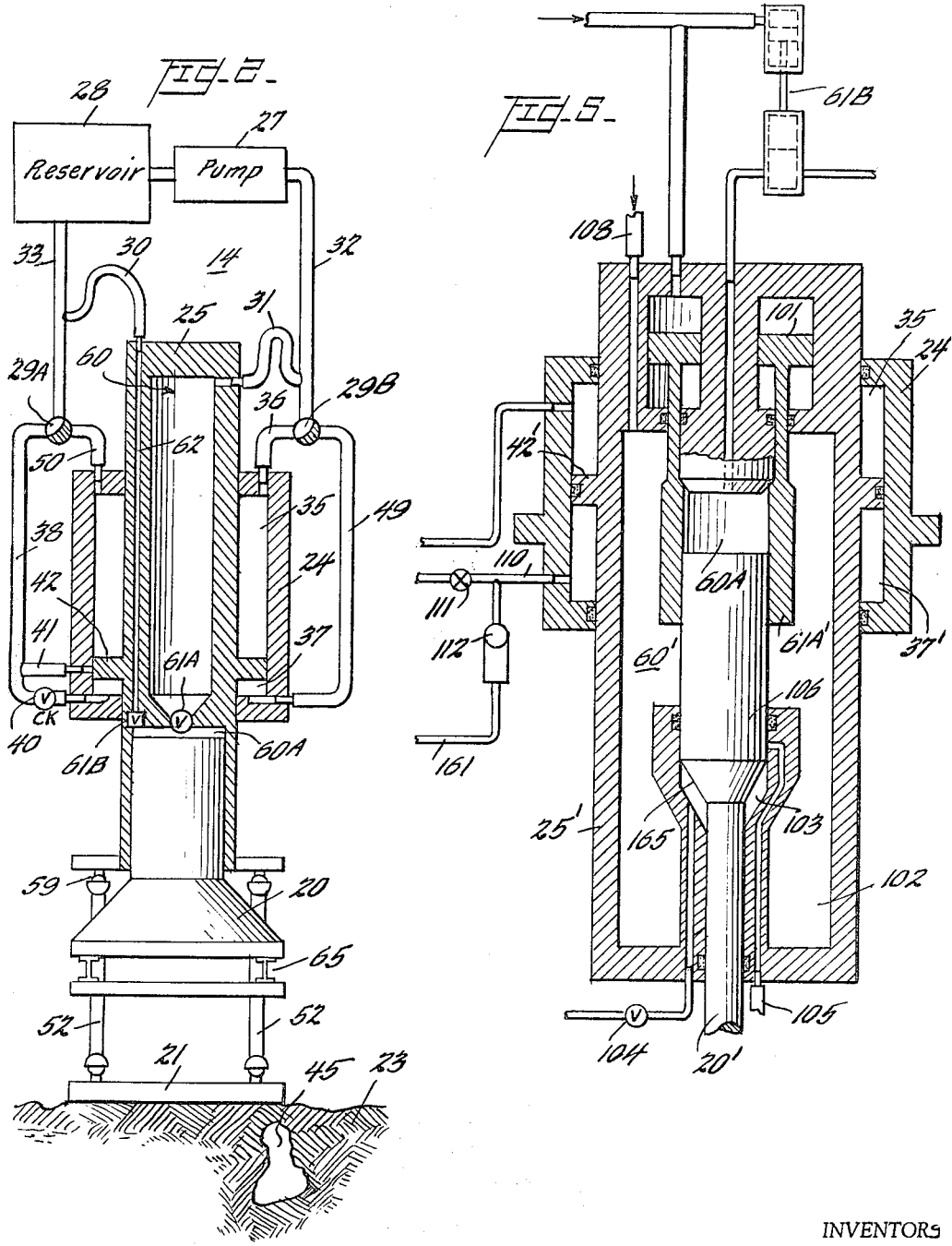
FIGURE 2 is a diagrammatic section view of an impact generator afforded in an embodiment of the invention.

Mobility is afforded by the vehicle mount of the seismic wave generator as shown in FIGURE 1, while the general system approach may be seen from FIGURE 2. The vehicle mount of FIGURE 1 is drawn to show the general configuration of the device, whereas in actual practice the impact generator 14 and hydraulic system may be interchanged to place the hammer weight at the center of gravity. This not only provides for lessened recoil impact but also places a greater percentage of the vehicle weight on the base plate 21. In this application, a front wheel drive vehicle is preferred to avoid interference with driveshaft position.

Thus, a typical carrier vehicle such as truck 10 has frame structure 12 holding an enclosed impact generator assembly 14 in position shown at the rear extremity of the truck bed for ease in understanding the principles of the invention. Hydraulic lines couple the impulse generator assembly 14 to a hydraulic system 16 mounted on the truck frame 17. It may be seen that the truck 10 has the back wheels 18 effectively jacked up from the earth 23 when the base plate 21 is lowered into operative position to thereby aid in seating the impulse generator into firm contact with the earth.

The typical hydraulic system of FIGURE 2 is constructed to control the operation of hammer 20, which strikes base plate 21 to provide shock waves in the earth 23. Thus, the hydraulic cylinder 24 is fastened to the frame 12 of the mobile carrier or truck 10, and both the hammer 20 and the strike plate assembly 25 are relatively movable independently with reference to the position of the fixed cylinder 24.

Also mounted on the vehicle are the hydraulic pump 27 and the low pressure reservoir 28 with attendant ganged dual path control valves 29A and 29B. Hydraulic supply lines 30 and 31 are flexible to permit relative motion of the strike plate assembly 25.

Thus, in operation control valves 29 may be adjusted to raise or lower the strike plate assembly 25 through hydraulic conduit between the pump line 32 and the exhaust line 33. In the position shown the valves serve to lower the strike plate assembly 25 into the earth 23, serving as shown in FIGURE 1 to support a portion of the vehicle weight. The hammer 20 may be used to seat the plate 21 more firmly before taking recordings. As will be seen from the control apparatus later discussed, the hammer may be actuated manually so that it need not be coupled for operation concurrently with the recording apparatus for two or three impacts to seat the base plate 21. This conditions the earth to produce a higher signal to noise ratio upon subsequent cycles when the recording apparatus is brought into use.

In lowering the base plate 21, valve 29B permits flow from pump line 32 into hydraulic chamber 35 via inlet line 36, to thereby force the assembly 25 downward and exhaust fluid from chamber 37 via outlet line 38 and control valve 29A. Since considerable force may be applied hydraulically during the positioning of base plate 21, a travel limit damping assembly is provided by means of preloaded outlet pressure valve 40 which restricts free hydraulic flow which is attainable through outlet pipe 41 until the flange 42 is lowered to a position closing the pipe 41. The preloaded valve 40 thus premits the chamber 37 to be scavenged whenever the pressure exceeds a predetermined design value. This serves as a travel limit and damping means which prevents seating plate 21 with such force that the mechanism may be bent or broken if for example it is placed on soft ground. Also, if the base plate 21 were driven into soft earth, such as plowed ground, almost the entire force of the hydraulic system would be expended in driving flange 42 against the cylinder 24 resulting in possible damage to the system. Similar structure may be used to limit travel of the return stroke. Conversely, to raise the base plate 21 from the earth 23, control valves 29 are adjusted to couple inlet line 49 via valve 29B to the pump 27 thereby forcing fluid into chamber 37. Exhaust is similarly taken from outlet line 50 through valve 29A to the low pressure reservoir 28.

In order to permit a range of adjustment of the lower limits of the base plate 21 to allow operation when the vehicle wheels or base plate 21 for example are in a ditch, the rods 52 may comprise adjustable jacking means, thus permitting more universal use with the simplified hydraulic assembly illustrated. In this respect, they may be hydraulic cylinders, and are constructed preferably with ball joints 59 at each end to allow for a slight angle developing on base plate 21 during impact.

Motion of the hammer 20 is imparted hydraulically from stored high pressure compressed liquid in the driving reservoir chamber 60. Such compressible liquid techniques are well known in the hydraulic art. This pressure is released by fast acting valve 61A into the driving chamber 60A to force hammer 20 downwardly. Ganged release valve 61B is closed when the fast acting valve 61A is opened and vice versa to thereby develop pressure in chamber 60A, accelerating the hammer 20. Less than atmospheric pressure of reservoir 28 serves to retract the hammer 20 through the passageway including channel 62 and flexible tube 30, when the fast acting valve 61B is opened, thereby also operating to close section 61A, permitting pressure to build up in chamber 60 again.

Although from the viewpoint of shock wave excitation it is desirable to impart maximum striking force of the hammer 20 on base plate 21, certain limitations are imposed by conditions encountered, and the ability of the equipment to withstand repeated impacts. Thus, for example, rock 45 might cause the hammer 20 to exert a greater than maximum force by twisting base plate 21 to receive the hammer blow only on one side. Such could exert forces exceeding the design limits of the equipment. Accordingly, overload limiting means is afforded in the hammer structure to absorb excessive forces. In this manner, shear pins or fracturable I-beams 65 will afford overload protection.

From the description of construction and operation of the system sketched in FIGURE 2 it is evident that a hydraulic hammer is provided which can provide adequate seismic signals under the conditions encountered in mobile mounted units. With such equipment a hammer weighing 500 pounds can be driven easily by a simple hydraulic system to exert a 50,000 foot-pound impact. This is equivalent to a five ton hammer falling five feet. A significant advantage of the system is the speed at which the shock wave can be released. In falling weight devices it is difficult to release a heavy weight quickly and compensation is normally made in the associated recorder system for release and fall times, which become negligible in the present device, thereby producing improved performance with simpler recording techniques. In addition, the seismic wave signals are significantly improved by substantially tripling the impact velocity.

The views of FIGURES 3 and 4 combine to lay out schematically a more detailed system which illustrates the operation of the hydraulic system in controlling the hammer drive shaft 20'.

The vehicle motor 70 is used to power the hydraulic pump 27 via shaft 71 through an air powered clutch 72. Air line 73 supplies a pressure of 100 p.s.i. for operating the clutch when solenoid 74 is actuated by closing switch 75. All electrical power is provided by the twelve volt battery 176. Oil is pumped from reservoir 28 through filter 76 and cooler 78 is passed by pipe 79 through the open center section of valve 80 to pipe 81. A pressure relief valve 82 is provided leading back to reservoir 28 whenever pressure in the system exceeds a safe value.

When solenoid 83 is energized, valve 80 will send oil through line 84 through check valve 85. Switch 86 serves to operate solenoid 83 when pump 27 is operating after either a time delay or responsive to pump pressure.

Initially, oil flows through check valve 85 and line 84 through valve 87 to retract hydraulic cylinder 101. To understand operation of the cylinder assembly the diagrammatic view of FIGURE 5 may be considered.

As illustrated in FIGURE 5, a further hydraulic system embodiment is provided for functioning in a manner similar to that of FIGURE 2 where similar reference characters are used. Thus, the hammer assembly shaft 20' is driven by hydraulic pressure released into driving chamber 60A by operation of sliding valve assembly 61A', through hydraulically operated piston 101. This permits high pressure stored in chamber 60' to enter driving chamber 60A and force the hammer assembly shaft 20' downwardly until a limiting position is reached in the exhaust of damping chamber 103 through pressure valve 104 rather than the outlet line 105 sealed by piston wall 106.

Positioning of the movable hammer drive assembly 25' within the fixed hydraulic cylinder 24' occurs as described in connection with FIGURE 2.

This embodiment permits the pressure to be intensified before it is applied from the hydraulic system through inlet pipe 108 to high pressure chamber 60', so that it is much higher than used for controlling simultaneously valves 61A and 61B to release the hammer stroke and exhaust the driving chamber 60' in sequence as the piston valve 61A is lowered.

Because of this high pressure, the assembly 24 tends to absorb some of the shock of the hammer drive and thus, the flange 42' remains above the outlet pipe 110, which is controlled through valve 111 until pressure builds up to discharge through relief valve 112. This permits chamber 37' to act as a shock absorber during the hammer impact cycle as well.

Thus, as seen from FIGURES 3 and 4, valve 61A is closed and cylinder 101 is retracted when valve 87 permits travel of oil from line 84 in its normal position. Also line 84 supplies accumulator 120, which holds the pressure for later operations. This pressure is stored and does not require connection of pump 27 to line 84 since check valve 85 maintains pressure at the accumulator 120.

Pressure switch 121 is provided on line 84 and is set for operation at 2,000 p.s.i. Upon reaching this operation pressure, solenoid 83 operates valve 80 to its third position to couple pump 27 to line 122. This delivers oil through check valve 123 to pipe 108 serving to fill cylinder 60' and to pass to the lifting mechanism 24. Thus, flange 42' is positioned depending upon polarity of switch 124 operating solenoid 125 to control valve 111. When switch 124 is closed oil will enter the upper (right hand) cavity 35 and send the base plate assembly against the ground, lifting the truck body.

When the storage chamber 60' is filled and the positioning cylinder is operated pressure switch 130 is operated via line 122, which powers intensifier 131 through leads 132. Because of a four-way, three-position valve 133, which is spring centered to normally closed position when power is off, the intensifier is inoperative up to this time. When power is applied at lead 132, either solenoid 134 or 135 is operated depending upon the residual contact position of relay 136 when the power was removed.

As shown, relay 136 will power solenoid 134 to operate the left-hand section of valve 133. Thus, oil in line 122 reaches line 137 at the left of the intensifier 131, driving piston 138 to the right pushing high pressure oil into the driving chamber 60' through outlet line 140. Check valves 141 maintain line pressures. When the piston reaches the limit of travel, a surge of up to 3,080 p.s.i. is supplied closing pressure switch 142. This in turn energizes the lower coil of relay 136 to power the alternate solenoid 135. The sequence is thus continued until about five cycles are completed in some eleven seconds with a forty horsepower source, providing enough energy for a 50,000 foot-pound impact.

Pressure is read in the indicating controller 145 through branch line 146. Four operational switches are included. Counter 147 counts every time the pressure exceeds 10,000 p.s.i. and counter 148 counts each time the pressure exceeds 23,000 p.s.i. The remaining two switches remove power from the clutch 72, the intensifier system 131 and the directional flow valve 80. Switch 150 provides for stopping the system at either the high or low pressure. If pressure leaks sufficiently the system will automatically be re-engaged when switch 75 is closed.

To fire the system and release the hammer drive stroke, switch 151 is closed to operate solenoid 152 and valve 87 via lead 154 to change the normal spring held position. Thus, oil from accumulator 120 through line 84 positions cylinder 101 to open valve 61A and close valve 61B. Line 155 serves as the return line to the low pressure reservoir 28. The energy stored in the compressed liquid is thus released in chamber 60A and drives the shaft 20' and hammer with great acceleration to strike the base impact plate. Recoil in the positioning cylinder operates pressure responsive valve 160, say at 25,000 pounds force applied to the vehicle chassis to release oil into reservoir 28 via pipe 161.

Should the energy not be consumed by the ground impact, the hammer shaft 20', the angle 165 provides recoil against casing 25' causing recoil in cylinder 24 driving oil through the pressure responsive valve 112 into line 161.

Switch 124 can also serve to drive the jack assembly 52 (FIGURE 1) by releasing the 100 p.s.i. pneumatic pressure to air operated cylinders which position the striker plate respectively into transport or striking attitudes.

The hammer assembly itself is constructed as shown in FIGURE 6. Since, if strike plate 21 is slightly crooked when it seats on the ground, for example when caused if rock 45 is under one side of base plate 21, the force imparted to hammer faceplate 180 could twist or break the mechanism. Accordingly, a spherical bearing comprising ball socket 181 permits the hammer face plate 180 to adjust upon impact with plate 21. In addition, retaining shear pins may be provided at 183 about cylinder 182 so that excessive stresses will be dissipated in breaking a replaceable member.

Throughout this description it is clear that the recording of the seismic waves may be accomplished with conventional equipment, and therefore, to avoid obscuring the nature of the present invention the details of the recording equipment are omitted.

The foregoing disclosure illustrates that improved impulse seismic equipment is provided by this invention, and the novel features thereof are defined with particularity in the appended claims.

We claim:

1. An impulse seismic device comprising in combination, a mobile carrier, an impact hammer assembly including a movable hammer, a base plate for receiving impact blows from said hammer, a hydraulic pump, hydraulic pressure driving chamber means, means mounting the hammer assembly on the mobile carrier, adjustable means coupled to the hydraulic system comprising hydraulically operable means positionable in upper and lower limiting positions coupled for positioning the base plate relative to the mobile carrier with variable lower position limits to firmly contact the earth thereby supporting the hammer assembly and at least a portion of the weight of the mobile carrier, and means releasing the hydraulic pressure from the driving chamber means quickly to force the hammer to strike the base plate.

2. A device as defined in claim 1, including hydraulic damping means for arresting travel of the adjustable means at a predetermined limit position comprising a preloaded scavenger valve, a bypass valve shunting the scavenger valve and movable piston structure closing the bypass valve as the adjustable means travels to said limit position to thereby activate the scavenger valve.

3. A device as defined in claim 1, including protective structure comprising a pressure responsive relief valve bypassing fluid from said pressure chamber when recoil in the chamber exceeds a safe value for limiting the energy passed between the base plate and the hydraulic pressure driving chamber means.

4. A device as defined in claim 1, including protective means comprising an element coupling the hydraulic pressure driving chamber means to said hammer which is fracturable when the impact force of the hammer upon striking the base plate exceeds a safe value for limiting the force with which the hammer strikes the base plate.

5. A device as defined in claim 1 including manual control means for releasing said hydraulic pressure to impact the hammer into said base plate prior to generation of recordable seismic waves to thereby seat the plate more firmly on the earth.

6. A device as defined in claim 1 including hydraulic jacking means for relatively positioning the hammer and the baseplate, and means selectively maintaining a constant pressure to said jacking means.

7. An impulse seismic device comprising in combination, a mobile carrier, an impact hammer assembly including a movable hammer, a baseplate positioned to receive impact blows from said hammer, hydraulic jacking means coupled to relatively position the baseplate and the hammer, a hydraulic system driving the hammer in said assembly against said plate, and means selectively coupling a constant hydraulic pressure to the hydraulic jacking means when said hammer is driven into said plate with said hydraulic system.

References Cited by the Examiner

UNITED STATES PATENTS

| | | | |
|---|---|---|---|
| 1,857,624 | 5/1932 | Degenhardt et al. | 173—116 X |
| 2,624,177 | 1/1953 | Warren | 173—116 X |
| 2,816,618 | 12/1957 | Piety | 181—.5 |
| 3,209,854 | 10/1965 | Williams | 181—.5 |
| 3,215,223 | 11/1965 | Kirby et al. | 181—.5 |

BENJAMIN A. BORCHELT, *Primary Examiner.*

G. H. GLANZMAN, *Assistant Examiner.*